O. M. MORSE.
Middlings-Purifiers
No. 150,879. Patented May 12, 1874.
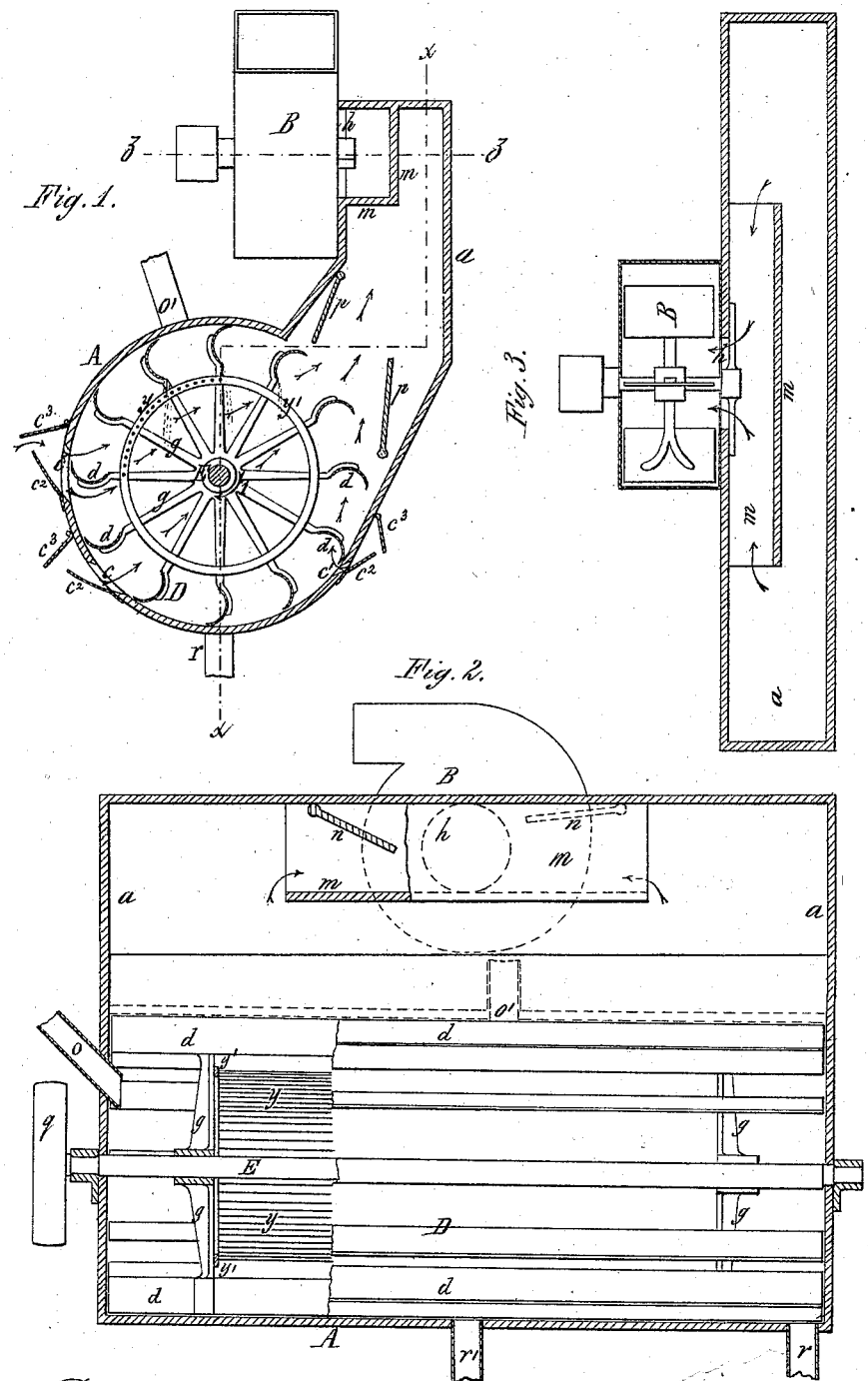

UNITED STATES PATENT OFFICE.

ORVILLE M. MORSE, OF OSWEGO, NEW YORK.

IMPROVEMENT IN MIDDLINGS-PURIFIERS.

Specification forming part of Letters Patent No. 150,879, dated May 12, 1874; application filed March 28, 1874.

*To all whom it may concern:*

Be it known that I, ORVILLE M. MORSE, of the city and county of Oswego, in the State of New York, have invented certain Improvements in Middlings-Purifiers, of which the following is a specification:

The subject-matter of this application comprised originally part of a former application, filed by me February 13, 1874, from which the present improvements have been withdrawn. The main feature of the machine described in my said application is an open elevating-wheel arranged in an exhaust case or chamber, and composed of buckets, by which the material is carried upward to a certain height, and then discharged on the succeeding bucket, the material, in its fall from bucket to bucket, being subjected to the action of a current of air, which separates the impurities, and carries them upward to a fan, while the granules of good middlings descend, the material being repeatedly elevated and subjected to this air-current until it reaches the tail-end of the machine, where the middlings are discharged, divested of the impurities.

My present improvements consist of a special arrangement of the buckets, by which the material is raised to near the top of the wheel before it is discharged, the middlings falling to the bottom of the inclosing-case, where they are scooped up and again elevated by the buckets, properly constructed for the purpose; and also of certain special combinations, of which this arrangement of the buckets forms an element.

In the accompanying drawing, Figure 1 is a vertical cross-section, and Fig. 2 is a longitudinal vertical section in line $x\,x$, Fig. 1. Fig. 3 is a horizontal section in line $z\,z$, Fig. 1.

Like letters of reference designate like parts in all of the figures.

A is the case of the machine, and $a$ an extension thereof; B, the suction or exhaust fan; $c\,c^1$, air-inlet openings in the case; D, the elevating-wheel; and $d$, the buckets or wings thereof, shown in the drawings as secured to the ends of the radial arms $g$ of the shaft E. The buckets $d$ are made of a curved form, and arranged nearly radially, as clearly shown in the drawing, so that their inner edges serve to retain the material scooped up from the bottom of the case by their outer curved edges until they arrive nearly to a vertical line, when the middlings are dumped and permitted to fall, clear of the buckets, back to the bottom of the case, where they are again picked up by the succeeding buckets, in contradistinction to falling from one bucket to the next, as described in my application filed February 13, 1874, hereinbefore referred to. The air-inlets $c\,c^1$ consist of longitudinal openings formed in the case, and provided with guard-boards $c^2$ to prevent the escape of the material through said openings, and hinged wings or flap-boards $c^3$, by which the size of the openings is regulated. The wheel and case are slightly inclined from a horizontal position, in the manner of an ordinary reel. The unpurified middlings are fed into the case through a spout, $o$, in the head thereof, as shown in Fig. 2, or through an opening in the top of the case at the head, and the purified middlings discharged through an opening or openings in the bottom of the case, as shown at $r$. $y\,y$ are a series of longitudinal wires or rods arranged in the form of a cylinder, and secured in rings $y'$, attached to the radial arms of the wheel inside of the buckets, for a purpose presently to be explained. $h$ is the opening in the center of the upper portion $a$ of the case, communicating with the eye of the fan. In order to prevent the air-current concentrating toward this opening in the center of the case, I arrange a shield or guard-board, $m\,m$, in front of the opening $h$, so as to compel the air-current to divide and pass around the ends thereof, in order to enter the eye of the fan. Each end of this shield is provided with a valve, $n$, attached to a rod extending outward through the case, by which the force of the air-current is regulated, and the intensity thereof, at either end of the machine, may be slightly increased or diminished over that at the opposite end, as may be required. $p\,p$ are two hinged deflecting-boards or valves, arranged longitudinally in the extension $a$ of the case, by which the direction and force of the air-current, as it enters the extension $a$, may be regulated. $q$ is a pulley, by which the wheel is revolved in the direction of the arrow 1.

The unpurified middlings, being fed into the head of the case, are scooped up, by the buckets $d$, from the bottom thereof, and elevated to near the top of the wheel, when the change in the inclination of the buckets causes the contents thereof to be discharged from the inner edge upon the wire cylinder $y\ y$, which operates to divide and break up the material as it falls through the same, and also slightly retard the descent thereof, without obstructing the free passage of the air which enters through the openings $c\ c^1$. In the descent of the material, it passes through the current of air induced by the fan, which is of sufficient force to separate a portion of the impurities, and carry them upward to the fan, while the partially-purified middlings again fall to the bottom of the case, whence they are again taken up and elevated by the buckets, the operation being continuously repeated until the middlings have reached the tail of the machine, and have become entirely divested of the impurities.

The length of time during which the middlings are thus operated upon can be readily increased or diminished, as required, by varying the inclination of the wheel and case in the same manner as in an ordinary flour-bolt.

The air-inlet $c^1$ is designed to admit a sufficient quantity of air to prevent the formation of any eddy on the descending side of the wheel, and carry upward any impurities which may have fallen out of the main air-current.

Coarse wire-cloth, or any other suitable device that will divide and break up the falling mass of material without obstructing the free passage of the air, may be used, instead of the rods $y$.

In order to enable different grades of middlings to be purified and discharged separately in the same machine, I arrange another discharge-opening, $r'$, at or near the center of the bottom of the case, through which the middlings from the material fed into the head of the machine will be discharged when they reach this point. An opening, $o'$, is arranged in the upper portion of the case, at a point a little below the discharge-aperture $r'$, through which a second or different grade of middlings can be fed into the machine, and be purified in the lower or tail portion of the machine, in a similar manner as the other grade was purified in the upper or head portion thereof.

The arrangement of the buckets, hereinbefore described, permits the material to be fed into the case, and between the buckets, at any case along the upper portion thereof, which cannot be done when the buckets are arranged as described in my previous application.

What I claim as my invention is—

1. The combination, with the exhaust-case A, of an elevating-wheel provided with buckets $d$, arranged so as to scoop up and elevate the material from the bottom of the case, and discharge it at or near the top thereof, so as to be subjected to action of an air-current in its descent for separating and removing the impurities therefrom, substantially as hereinbefore set forth.

2. The combination of the elevating-wheel D $d$ with the exhaust-case A, provided with two feed and two discharge apertures, arranged for purifying two grades of material at the same time, and separately discharging the purified middlings thereof, substantially as hereinbefore set forth.

3. The combination, with the exhaust-case and elevating-wheel, of the disintegrator $y\ y'$, substantially as hereinbefore set forth.

ORVILLE M. MORSE.

Witnesses:
  J. J. BONNER,
  EDWARD WILHELM.